United States Patent
Lemense et al.

(10) Patent No.: US 10,293,645 B2
(45) Date of Patent: **\*May 21, 2019**

(54) MAGNETIC SENSOR USED FOR COMMUNICATION

(71) Applicant: INFINEON TECHNOLOGIES AG, Neubiberg (DE)

(72) Inventors: Thomas Lemense, Farmington, MI (US); Thomas Lange, München (DE); Jooil Park, Kyungki-do (KR)

(73) Assignee: Infineon Technologies AG (DE)

( \* ) Notice: Subject to any disclaimer, the term of this patent is extended or adjusted under 35 U.S.C. 154(b) by 0 days.

This patent is subject to a terminal disclaimer.

(21) Appl. No.: 16/050,433

(22) Filed: Jul. 31, 2018

(65) Prior Publication Data

US 2018/0361800 A1    Dec. 20, 2018

Related U.S. Application Data

(63) Continuation of application No. 15/246,014, filed on Aug. 24, 2016, now Pat. No. 10,052,922.

(51) Int. Cl.
*B60C 23/04* (2006.01)

(52) U.S. Cl.
CPC ........ *B60C 23/044* (2013.01); *B60C 23/0461* (2013.01); *B60C 23/0486* (2013.01)

(58) Field of Classification Search
CPC .............. B60C 23/044; B60C 23/0461; B60C 23/0486
USPC .......................................................... 340/445
See application file for complete search history.

(56) References Cited

U.S. PATENT DOCUMENTS

| 4,067,235 | A | | 1/1978 | Markland et al. |
| 5,463,374 | A | * | 10/1995 | Mendez .............. B60C 23/0433 340/442 |
| 6,543,279 | B1 | | 4/2003 | Yones et al. |
| 7,446,525 | B2 | | 11/2008 | Pullini |
| 7,518,493 | B2 | | 4/2009 | Bryzek et al. |
| 7,551,069 | B2 | | 6/2009 | Cohen |
| 7,882,732 | B2 | | 2/2011 | Haralampu et al. |
| 10,052,922 | B2 | * | 8/2018 | Lemense .............. B60C 23/044 |

(Continued)

FOREIGN PATENT DOCUMENTS

EP    1 772 295 B1    1/2007

OTHER PUBLICATIONS

MDT Announces PicoTesla Ultra-low Noise and Ultra-compact TMR Linear Magnetic Field Sensors; PR Newswire, San Jose, Calif. and Zhangjiagang, Jiangsu, China, Jan. 18, 2016; http://www.multivu.com/players/English/7429652-mdt-tmr-magnetic-field-sensors/Accessed Aug. 24, 2016.

*Primary Examiner* — Eric Blount
(74) *Attorney, Agent, or Firm* — Design IP

(57) ABSTRACT

A sensor device and a communication method are provided. The sensor includes a microcontroller unit, and a receiver electrically connected to the microcontroller unit and configured to receive at least one communication signal. The receiver includes a magnetic sensor configured to detect a modulated electromagnetic carrier signal as a first communication signal and output an encoded measurement signal based on the detected modulated electromagnetic carrier signal. The sensor device further includes a demodulator configured to convert the encoded measurement signal into a data signal and output the data signal to the microcontroller unit.

20 Claims, 5 Drawing Sheets

(56) References Cited

U.S. PATENT DOCUMENTS

| | | |
|---|---|---|
| 2002/0075145 A1 | 6/2002 | Hardman et al. |
| 2002/0101339 A1* | 8/2002 | Burns ................. B60C 23/02 |
| | | 340/442 |
| 2006/0061008 A1 | 3/2006 | Kamer et al. |
| 2007/0080794 A1 | 4/2007 | Thiele |
| 2007/0096888 A1 | 5/2007 | Blixhavn |
| 2014/0015658 A1 | 1/2014 | Jain et al. |
| 2014/0118134 A1 | 5/2014 | Won |
| 2014/0195104 A1 | 7/2014 | Hammerschmidt |
| 2014/0368325 A1 | 12/2014 | Yu et al. |
| 2016/0252543 A1 | 9/2016 | Hammerschmidt et al. |
| 2017/0363581 A1 | 12/2017 | Makin et al. |

\* cited by examiner

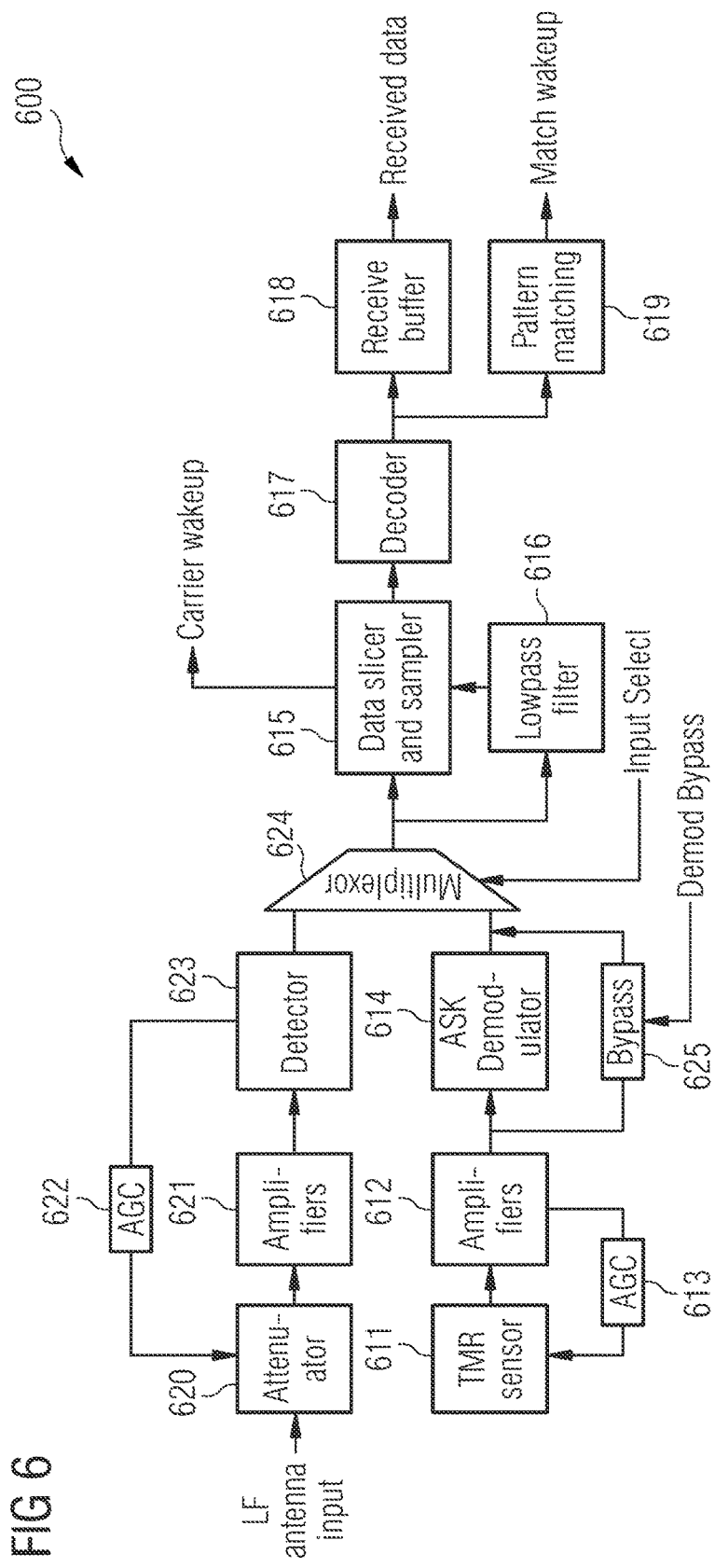

MAGNETIC SENSOR USED FOR COMMUNICATION

CROSS-REFERENCE TO RELATED APPLICATIONS

This application is a continuation of U.S. patent application Ser. No. 15/246,014, filed Aug. 24, 2016, which is incorporated by reference as if fully set forth.

FIELD

The present disclosure relates generally to a tire pressure monitoring system, and, more particularly, to a tire pressure sensor having a magnetic sensor for receiving communications.

BACKGROUND

Tire Pressure Monitoring Systems (TPMS) play an important role in vehicle safety and emissions reduction. Several countries and governing bodies have enacted mandatory regulations that require vehicles to have TPMS; for example U.S., European Union & Korea. A majority of this market is served by direct tire pressure monitoring systems, in which each tire contains a TPMS sensor module. Due to this high market penetration, the cost and the size of these sensor modules is of high importance. Current sensor modules consist of a tire pressure sensor (TPS) integrated circuit, a battery, antennas for communication, and a very small number of discrete passive electrical components.

Most sensor modules use a motion detection sensor to conserve the life of the sensor module's battery by entering power-down mode while the vehicle is parked. In this way, the service life of the sensor and its non-replaceable battery can be maximized. The typical motion detection sensor responds to g-force and is either an accelerometer or a shock sensor.

One requirement of the sensor module is to that of a bi-directional communication link. The uplink communication channel from the sensor module towards the TPMS receiver of an electronic control unit (ECU) is typically over an ultra-high frequency (UHF) radio link. The downlink communication channel towards the sensor is mainly used in during the production and testing of the sensor prior to installation in a tire and wheel assembly. TPMS sensors are able to receive data on the downlink from a low frequency (LF, typically 125 kHz) transmitter. Therefore, the typical TPS integrated circuit (IC) includes an LF receiver circuit. The LF receiver circuitry within the IC is connected to a resonant LF antenna network. This network typically consists of a capacitor, a resistor and a wire wound high sensitivity coil. The LF antenna circuitry is all contained within the confines of the sensor module.

The LF antenna coil is constrained by physics. It consists of a high permeability ($\mu_r$) core, with many turns of fine-gage wire wrapped around it. The wire ends are terminated and the entire assembly is contained within a form that is compatible with printed circuit board (PCB) assembly equipment. The coil is delicate, costly, and somewhat immune to the size reduction that occurs with other passive electronic components. A typical LF antenna network costs about 0.15€ and occupies around 20 mm² of PCB area. The possibility to further shrink the LF antenna is limited by physics. A smaller size antenna requires a higher sensitivity receiver. This, in turn, requires more operating current. Unless a higher communication frequency is chosen, the LF coil will likely remain the same size for the foreseeable future.

Furthermore, the LF antenna is resonant, in order to provide a voltage amplification of the very small (on the order of millivolts) voltage induced across the LF antenna coil. The resonant antenna network typically has a Q factor on the order of 5-10. One disadvantage of a resonant antenna is that magnetic impulse energy, e.g., from solenoids, relays or motors, will excite the resonant antenna and cause it to "ring" at its resonant frequency. These impulse noise events occur often in vehicles, and can disrupt LF communication from taking place.

There is a second type of uplink that has been used in the past with TPMS, that of a magnetic reed switch that, when actuated, initiates a "learn mode" in the TPMS sensor. Historically, this has been implemented using a mechanical switch. The advantage of this sort of uplink is that the only tool required is a permanent magnet. However, the magnetic reed switch has proven to be a reliability risk in terms of surviving the harsh mechanical environment that a TPMS sensor must endure. Furthermore, the size of the switch is significant (e.g., typically about 12 mm in length and about 2 mm in diameter). Like the LF antenna coil, the magnetic reed switch will likely remain the same size for the foreseeable future.

Therefore, an improved device that retains the LF uplink functionality required by the TPMS sensor module without incurring additional bulk and cost may be desirable.

SUMMARY

Embodiments further provide a device having a tire pressure monitoring system (TPMS) sensor and a communication method are provided.

According to one or more embodiments, a TPMS sensor includes a microcontroller unit, a pressure sensor electrically connected to the microcontroller unit and configured to measure an internal air pressure of a tire and a receiver electrically connected to the microcontroller unit and configured to receive at least one communication signal. The receiver includes a magnetic sensor configured to detect a modulated low-frequency electromagnetic carrier signal as a first communication signal and output an encoded measurement signal based on the detected modulated low-frequency electromagnetic carrier signal. The TPMS sensor further includes a demodulator configured to convert the encoded measurement signal into a data signal and output the data signal to the microcontroller unit.

According to one or more embodiments, a method for communicating with a tire pressure monitoring system (TPMS) sensor that includes a microcontroller unit and a receiver is provided. The receiver is electrically connected to the microcontroller unit and is configured to receive at least one communication signal using a magnetic sensor. The method includes detecting, by the magnetic sensor, a modulated low-frequency electromagnetic carrier signal as a first communication signal, outputting, by the magnetic sensor, an encoded measurement signal based on the detected modulated low-frequency electromagnetic carrier signal, converting, by a demodulator, the encoded measurement signal into a data signal, and outputting, by the demodulator, the data signal to the microcontroller unit.

According to one or more embodiments, the method may further include detecting, by the magnetic sensor, static magnetic fields, and transmitting, by the magnetic sensor, magnetostatic field information to the microcontroller unit.

According to one or more embodiments, the method may further include selectively bypassing, by a bypass circuit, the demodulator such that microcontroller unit receives the magnetostatic field information from the magnetic sensor, instead of a signal from the demodulator, when the bypass circuit is enabled.

According to one or more embodiments, the method may further include receiving, by the receiver, an antenna signal generated from a second communication signal received by an external antenna coil, and selectively outputting, by a multiplexer, one of a first signal or a second signal to the microcontroller unit, wherein the first signal is derived from the magnetic sensor and the second signal is derived from the antenna signal. The first signal may correspond to a signal based on detecting the modulated low-frequency electromagnetic carrier signal or the static magnetic fields.

BRIEF DESCRIPTION OF THE DRAWINGS

Embodiments are described herein making reference to the appended drawings.

FIG. 6 illustrates a block diagram of another LF receiver and demodulation circuit according to one or more embodiments.

DETAILED DESCRIPTION

Figure 1:
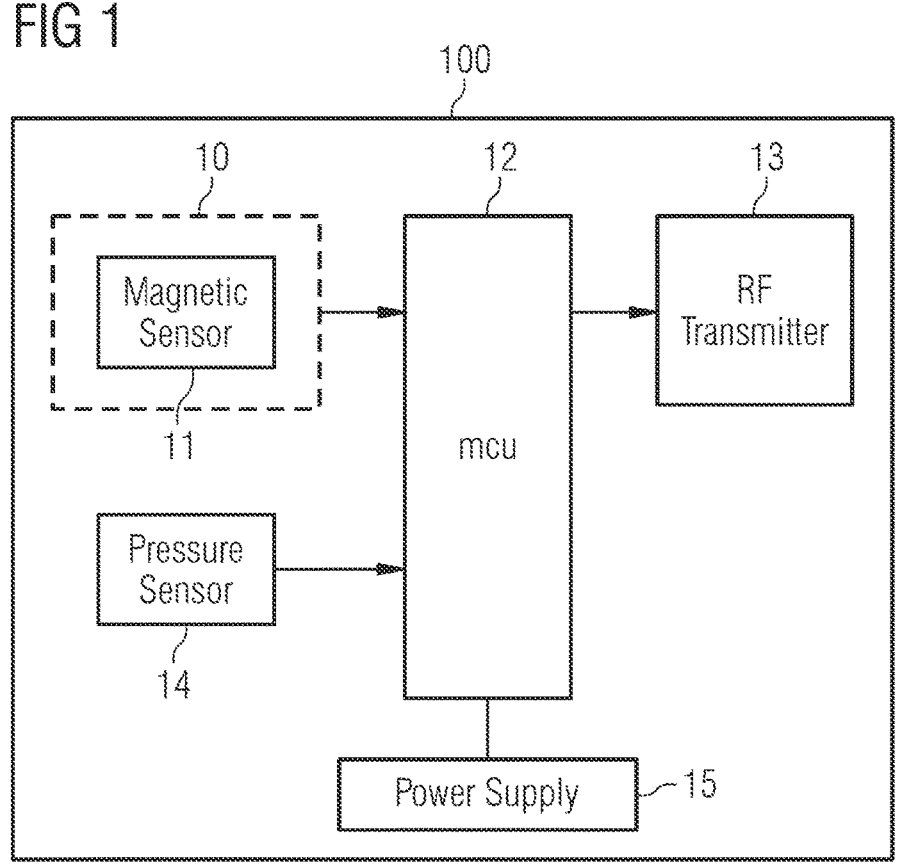
FIG. 1 illustrates a TPMS sensor including a magnetic sensor according to one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example, conventional components of sensor devices. Furthermore, well-known structures and devices are shown in block diagram form rather or in a schematic view rather than in detail in order to avoid obscuring the embodiments.

Features from different embodiments may be combined to form further embodiments, unless specifically noted otherwise. Variations or modifications described with respect to one of the embodiments may also be applicable to other embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to sensors and sensor systems and to obtaining information about sensors and sensor systems. A sensor may refer to a component which converts a physical quantity to be measured to an electric signal, for example, a current signal or a voltage signal. The physical quantity may for example comprise a magnetic field, an electric field, a pressure, a force, a current or a voltage, but is not limited thereto.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

A sensor module is provided that includes a magnetic field sensor that is integrated into a TPMS sensor integrated circuit. In particular, the magnetic field sensor replaces the PCB-mounted LF antenna coil and associated components for the TPMS LF uplink function. The magnetic field sensor is integrated into the TPMS sensor integrated circuit, either as a separate die inside the integrated circuit package, or monolithically as a part of the TPMS sensor die itself, and is configured to detect a LF communication field (i.e., a communication signal).

Magnetic field sensors are active detectors/receivers used in many applications to sense a magnetic field and variations thereof. In one or more embodiments, a magnetic field sensor may be a magneto-resistive sensor. Magneto-resistive sensors are often referred to as xMR sensors, which is a collective term for anisotropic magneto-resistive (AMR), giant magneto-resistive (GMR), and tunneling magneto-resistive (TMR). The sensor package may also include a signal processing circuit that receives a sensor signal (e.g., raw measurement data from the magnetic field sensor element) and derives, from the sensor signal, a measurement signal that represents the sensed magnetic field.

In particular, a TMR sensor may be used as the magnetic field sensor of the disclosed embodiments, although the embodiments are not limited thereto. TMR offers an advantage that it can detect both time-varying and static magnetic fields. Therefore, a single TMR sensing element may be able to provide both LF uplink and magnetostatic LF uplink functionality. This would be particularly advantageous, for example, in a sensor that is intended to emulate existing sensors (e.g., the LF uplink and magnetic switch uplink functions may be provided with no additional cost or size penalties). Further, it will be appreciated that the terms "sensor" and "sensing element" may be used interchangeably throughout this description.

FIG. 1 illustrates a monolithic TPMS sensor 100 including a receiver 10 that includes a magnetic sensor 11 according to one or more embodiments. The TPMS sensor 100 is a direct TPMS sensor mounted inside the tire. A magnetic sensor 11 can be incorporated as part of a typical semiconductor technology. Therefore, a magnetic sensor 11 can enable a monolithic TPMS sensor 100 which includes the TMR sensor 11, a microcontroller unit (MCU) 12, radio frequency (RF) transmitter 13, and a microelectromechanical systems (MEMS) pressure sensor 14. A power supply 15 (e.g., a battery cell) is further provided to supply power to the TPMS sensor 100 and its components. Thus, disadvantages of multiple dies are not incurred, nor are LF antenna coils or magnetic reed switches required.

In particular, the magnetic sensor 11 is configured to receive LF communication signals from a vehicle electronic control unit (ECU), a setting tool, a diagnostic and testing tool, and the like. The MCU 12, is configured to receive signals from one or more components of the TPMS sensor 100, process the received signals and control the components via control signals. The MCU 12 may further include one or more memory devices or be electrically connected to one or more memory devices provided in the TPMS sensor 100. The RF transmitter 13 is electrically connected to the MCU 12 and is configured to transmit a radio signal to the vehicle ECU, the setting tool, or the diagnostic and testing tool. The RF transmitter 13 may transmit a signal (e.g., data and/or feedback information) to the vehicle ECU, the setting tool, or the diagnostic and testing tool in response to the magnetic sensor 11 receiving an LF signal (e.g., data in the form of information or a command) from the vehicle ECU, the setting tool, or the diagnostic and testing tool. The pressure sensor 14 is electrically connected to the MCU 12 and configured to measure the internal air pressure of a tire.

While not shown in FIG. 1, the TPMS sensor 100 my further include a temperature sensor electrically connected to the MCU 12 and configured to measure the internal temperature of the tire, and an acceleration sensor electrically connected to the MCU 12 and configured to measure the acceleration of the tire.

While the TPMS sensor 100 is illustrated as a monolithic device (i.e., single die integration), it will be understood that one or more components (e.g., the magnetic sensor 11) may be provided on a separate die inside the integrated circuit package of the TPMS sensor 100.

As mentioned above, the magnetic sensor 11 may be a TMR sensor, but is not limited thereto. In general, the magnetic sensor 11 is configured as a receive-only antenna to sense a magnetic field, convert the sensed magnetic field into a corresponding signal, and to output a signal to the MCU 12 or to other signal processing circuitry. In particular, the magnetic sensor 11 is configured to receive communication signals over an electromagnetic field by a modulated low-frequency electromagnetic carrier signal (i.e., carrier signal) that is modulated, for example, by amplitude shift keying (ASK). The carrier signal has a carrier frequency (e.g., low-frequency) such that, when the carrier signal is present, the electromagnetic field oscillates between a north-pole polarity and a south-pole polarity at the carrier frequency which produces an alternating magnetic field detected by the magnetic sensor 11. A frequency band below 300 kHz is "low frequency", and, more particularly, between 30 kHz and 300 kHz. In this way, the carrier signal can be modulated as a command code representing a specific command that can be received by the magnetic sensor 11 and decoded by signal processing circuitry to provide a command to the MCU 12. Additionally, the carrier signal may by encoded to provide data to the TPMS sensor 100.

ASK is a form of amplitude modulation that represents digital data as variations in the amplitude of a carrier signal. In one embodiment of an ASK system, the binary symbol 1 is represented by transmitting a fixed-amplitude carrier signal and fixed frequency for a bit duration of T seconds. If the signal value is 1 then the carrier signal will be transmitted; otherwise, a signal value of 0 will be transmitted. The specific time pattern of on/off times of the carrier signal, including the duration thereof, represents the modulation of the carrier signal and, hence, the encoding of the information in the signal. ASK uses a finite number of amplitudes, and usually, each amplitude encodes an equal number of bits. A demodulator, which is designed specifically for the symbol-set used by the modulator, determines the amplitude of the received signal and maps it back to the symbol it represents, thus recovering the original data. The frequency of the carrier signal is kept constant.

The magnetic sensor 11 may be a single axis or a multiple axis magnetic sensor, and, in particular, may be an earth magnetic field sensor. That is, the magnetic sensor 11 is configured with a high sensitivity, sensitive enough to detect a small magnetic field having a magnitude in a range of the Earth's magnetic field (e.g., 25 to 65 microteslas). Thus, an earth magnetic field sensor can sense variations in the Earth's magnetic field. In other embodiments, the magnetic sensor 11 may be single axis or multiple axis magnetic sensor that is sensitive enough to detect a magnetic field with a magnitude in the order of nano-Teslas (nT, e.g., in the range of 1 to 10 nT).

Furthermore, the magnetic sensor 11 should be fast enough to detect and respond to a modulated low-frequency carrier signal in order to output the coded information, either in the form of an analog or a digital signal. For example, the magnetic sensor 11 may include one or more sensor elements and an analog-to-digital converter (ADC) that converts the analog signal from the one or more sensor elements to a digital signal. The magnetic sensor 11 may also include a digital signal processor (DSP) that performs some processing on the digital signal, to be discussed below.

Thus, the magnetic sensor 11 may be a TMR sensor. TMR sensors have enough sensitivity to detect earth's magnetic field range (+/−1000 mG). TMR sensors also exhibit low current consumption because the current which passes into TMR layer is very small due to its use of the tunneling effect. For example, a 3-axis earth magnetic field sensor based on TMR principle may be used as the magnetic sensor 11.

As described above, the TPMS sensor 100 may be completely monolithic and the magnetic sensor 11 is configured to receive communications over an electromagnetic field by a modulated low-frequency electromagnetic carrier signal (i.e., carrier signal) that is modulated, for example, by ASK. The carrier signal has a carrier frequency (e.g., low-frequency) such that, when the carrier signal is present, the electromagnetic field oscillates between a north-pole polarity and a south-pole polarity at the carrier frequency which produces an alternating magnetic field detected by the magnetic sensor 11. Thus, the modulated low-frequency carrier signal is encoded with a time pattern that represents information (e.g., a command, information or other data) transmitted on the downlink channel to the TPMS sensor 100 and detected by the magnetic sensor 11. A magnetic sensor signal is then output from the magnetic sensor 11 such that the encoding of the carrier signal, and thus the transmitted information, can be determined by the TPMS sensor 100 (e.g., by the MCU 12).

The MCU 12 may receive raw measurement data (e.g., analog signals) output from the magnetic sensing element of the magnetic sensor 11 based on the modulated carrier signal. The MCU 12 may include a LF receiver and demodulation circuit to process the raw measurement data and decode the information conveyed by the raw measurement data. Upon decoding the information, the MCU 12 may perform a function in response to the decoded information. For example, the MCU 12 may command the RF transmitter 13 via a control signal to transmit feedback information (e.g., tire pressure information, sensor ID, status information, or the like). Alternatively, some or all of LF receiver and demodulation circuitry may be provided in the TPMS sensor 100 external to the MCU 12, which ultimately receives the decoded information. For example, the magnetic sensor 11 may include at least a portion of the LF receiver and demodulation circuitry, perform processing on the raw measurement data, and output a digital signal to the MCU 12 for further processing of the digital signal.

Figure 2:
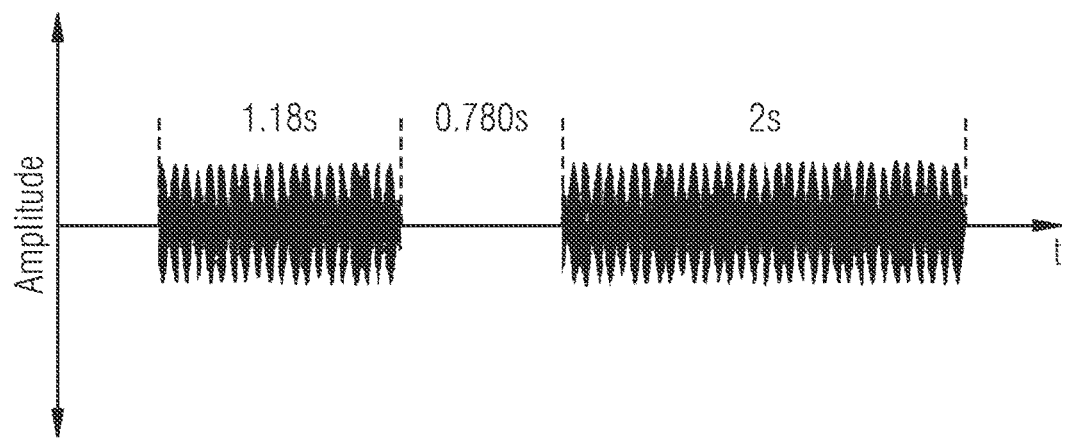
FIG. 2 illustrates a time-domain plot of a modulated carrier signal implemented according to one or more embodiments.

In view of the above, LF uplink magnetic field communication is provided. For example, FIG. 2 illustrates an example of a time-domain plot of the 125 KHz modulated carrier signal (aliased) over time (t) that is transmitted as a LF uplink magnetic field communication and is detected by the magnetic sensor 11. Specifically, FIG. 2 illustrates a slow ASK modulated 125 kHz carrier signal that uses a range of about 0.5-2.0 seconds for the "on" time. For example, the carrier signal is modulated such that the carrier signal is present or not present, the time pattern of which represents the encoded information. As shown in FIG. 2, the carrier signal is present for 1.18 seconds, not present for 0.78 seconds, and present again for 2.0 seconds. When the carrier signal is present, the magnetic field oscillates between its north and south poles at the carrier frequency (e.g., 125 kHz). The magnetic sensor 11 is configured to detect the presence of the carrier signal at the carrier frequency or the absence thereof.

Figure 3:
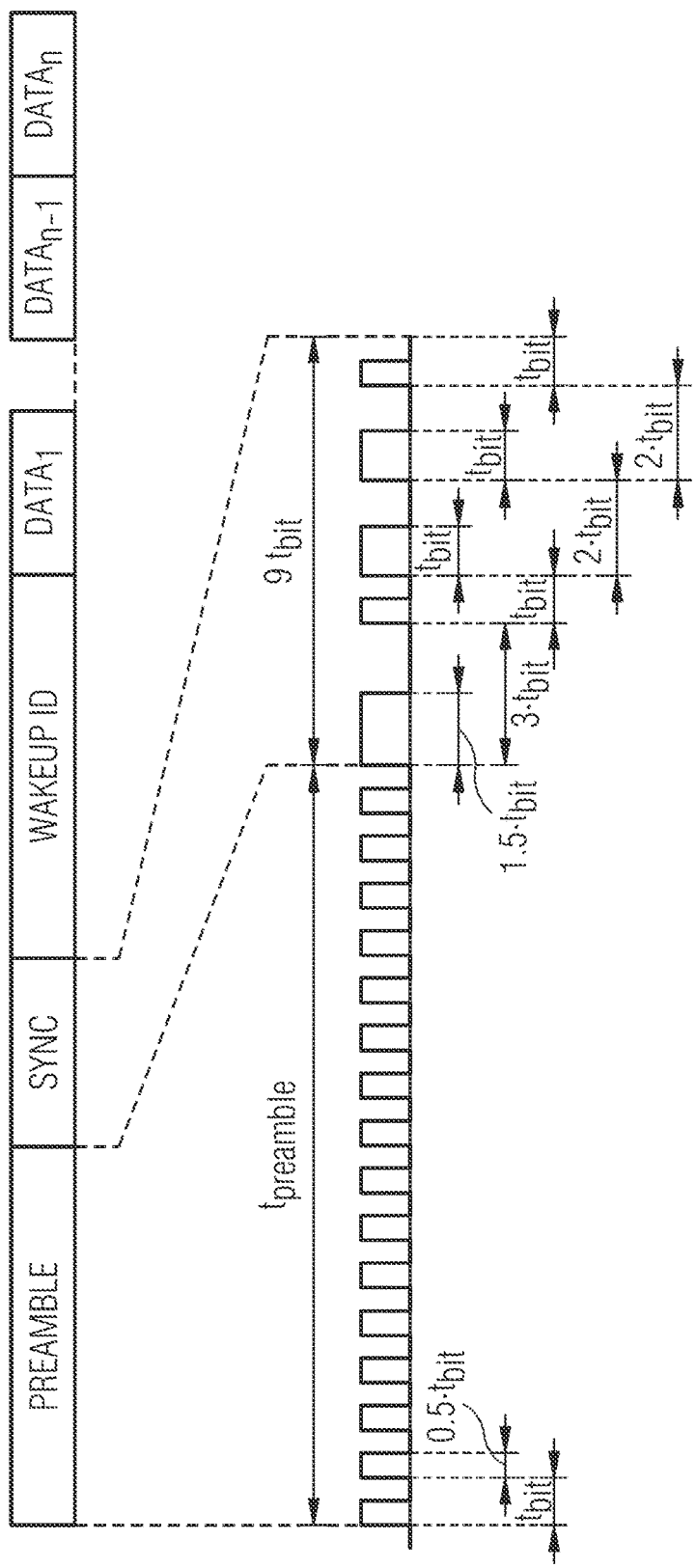
FIG. 3 illustrates a time-domain plot of another modulated carrier signal implemented according to one or more embodiments.

FIG. 3 illustrates another example of a 125 KHz modulated carrier signal that is detected by the magnetic sensor 11. Specifically, FIG. 3 illustrates a 3.96 kbps Manchester encoded ASK modulated 125 KHz carrier signal. Each "pulse" represents the presence of the carrier signal transmitted at the carrier frequency. Manchester coding is a line code in which the encoding of each data bit is either low then high, or high then low, of equal time. Thus, processing circuitry of the TPMS sensor 100 is configured to receive a measurement signal from the magnetic sensor 11 in order to decode the information. In particular, the carrier signal can be modulated to represent different parts of a data transmission (e.g., a preamble, sync sequence, a wakeup ID, data, and the like).

The LF uplink magnetic field communication described above can be used such that the carrier signal is modulated with a command code or other information. For example, during manufacturing of the TPMS sensor 100, a tester may transmit a command to the TPMS sensor 100 (i.e., the magnetic sensor 11) to verify that two-way communication is working properly. If the tester receives a verification signal from the RF transmitter 13, it can be assumed that the magnetic sensor 11 received the command properly.

In another example, the magnetic sensor 11 may be further configured to receive a sensor ID number associated with the TPMS sensor 100 by a setting tool. Alternatively, the sensor ID may be programmed into the MCU 12 during manufacturing. However, once the sensor ID is stored in a memory of the TPMS sensor 100, the magnetic sensor 11 may receive a command signal to transmit the sensor ID. For example, in response to the command signal, the RF transmitter 13 may be configured by the MCU 12 to transmit the sensor ID to an ECU upon installing the tire on the vehicle so that the sensor ID is coded into the vehicle.

In another example, the magnetic sensor 11 may receive a test signal (e.g., a trigger command or a status inquiry signal) to allow a tester to evaluate an operational state (e.g., working or not working) of the TPMS sensor 100 or to acquire information about the tire (e.g., pressure, temperature, acceleration, etc.). In response to the magnetic sensor 11 receiving the test signal, the RF transmitter 13 may be configured by the MCU 12 to transmit a response signal that indicates that the test signal was received by the TPMS sensor 100.

Figure 4:
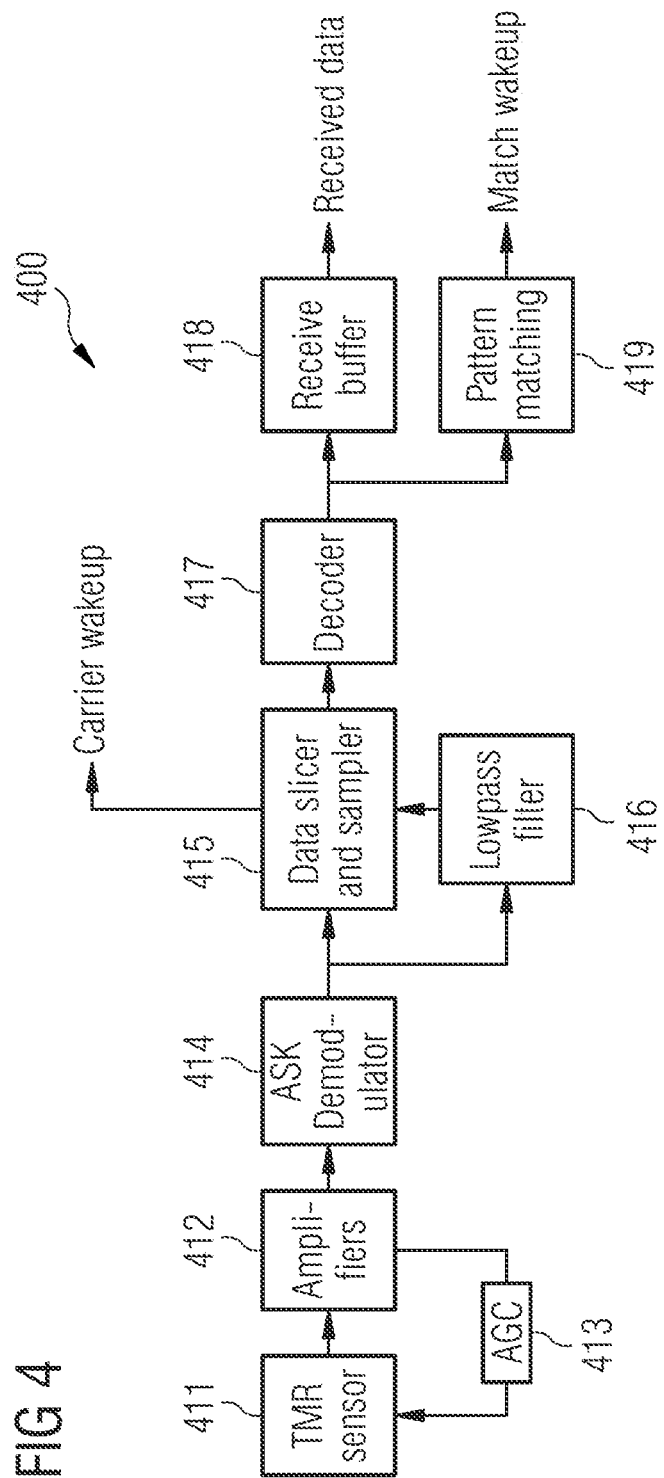
FIG. 4 illustrates a block diagram of a LF receiver and demodulation circuit according to one or more embodiments.

FIG. 4 illustrates a block diagram of a LF receiver and demodulation circuit 400 according to one or more embodiments. The LF receiver and demodulation circuit 400 is integrated in the TPMS sensor (e.g., the TPMS sensor 100 shown in FIG. 1). In particular, the LF receiver and demodulation circuit 400 includes a magnetic sensor 411, amplifiers 412, an automatic gain control 413, an ASK demodulator 414, a data slicer and sampler 415, a low pass filter 416, a decoder 417, a receive buffer 418 and a pattern matching unit 419.

The amplifiers 412 receive the input signal from the magnetic sensor 411 and output an amplified input signal to the ASK demodulator 414. The ASK demodulator 414 receives the amplified input signal from the amplifiers 412 and is configured to recover the information content from the modulated carrier signal, detected by the magnetic sensor 411, and output a digital signal representing the information (e.g., a binary data).

One or more of the components of the LF receiver and demodulation circuit 400 may be incorporated into an MCU of the TPMS sensor, integrated separately on the die of the TPMS sensor, or a combination thereof.

Figure 5:
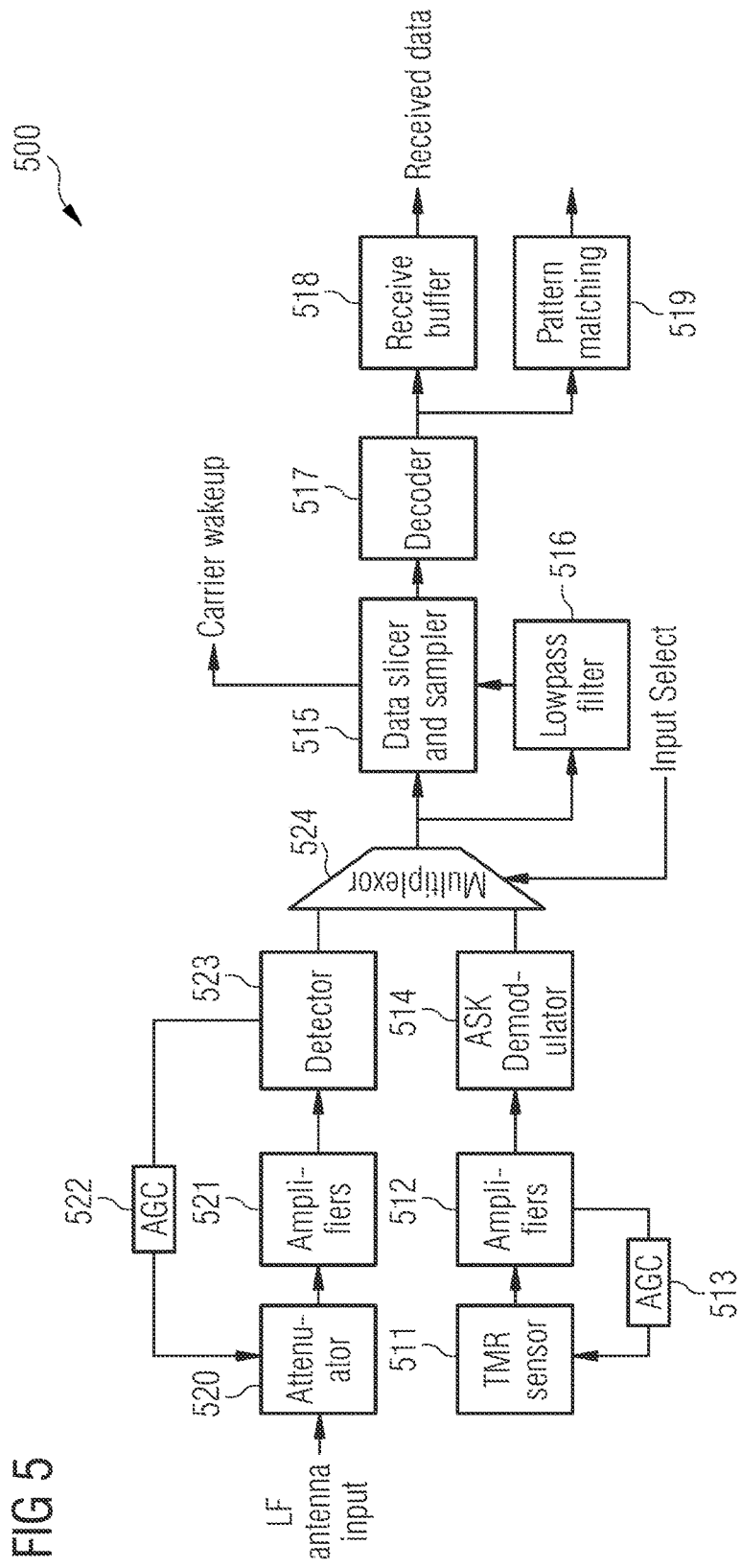
FIG. 5 illustrates a block diagram of another LF receiver and demodulation circuit according to one or more embodiments.

FIG. 5 illustrates a block diagram of a LF receiver and demodulation circuit 500 according to one or more embodiments. In particular, the LF receiver and demodulation circuit 500 incorporates dual functionality of receiving an input signal from one of a magnetic sensor and an external LF antenna coil. Thus, the LF receiver and demodulation circuit 500 can be selectively configured to receive and process an input signal from the magnetic sensor or the external LF antenna coil to be compatible for users which implement different communication systems (e.g., magnetic field link communication or traditional LF link communication).

The LF receiver and demodulation circuit 500 includes a magnetic sensor 511, amplifiers 512, an automatic gain control 513 and an ASK demodulator 514, a data slicer and sampler 515, a low pass filter 516, a decoder 517, a receive buffer 518 and a pattern matching unit 519. In addition, the LF receiver and demodulation circuit 500 includes an attenuator 520 configured to receive an input signal from an external LF antenna coil (not shown), amplifiers 521, an automatic gain control 522, a detector 523, and a multiplexer 524.

The multiplexer 524 is configured to select, via receipt of an input select signal, a signal from the magnetic sensor branch or the LF antenna coil branch of the receiver circuit. The selected signal is output from the multiplexer 524 for further processing by the subsequent components. Thus, a TPMS sensor that implements the LF receiver and demodulation circuit 500 can be used in both communication systems.

One or more of the components of the LF receiver and demodulation circuit 500 may be incorporated into an MCU of the TPMS sensor, integrated separately on the die of the TPMS sensor, or a combination thereof.

In addition to LF uplink magnetic field communication, magnetostatic uplink communication may also be provided by the TPMS sensor (e.g., TPMS sensor 100). xMR sensors (e.g., GMR, AMR, TMR, etc.) are sensitive to magnetic field orientation of the applied magnetic field. Thus, the magnetic sensor, such as a TMR sensor, may be configured to respond to both time-varying as well as static magnetic fields. For example, the magnetic sensor 11 may be a single or multiple axis magnetic sensor, such as a TMR sensor, that is configured to detect the motion of vehicle by detecting static magnetic fields (e.g., Earth's magnetic fields), as well as time-varying magnetic fields described above for enabling wireless communication.

In particular, the magnetic sensor 11 may be configured as an acceleration sensor (e.g., an accelerometer) to sense the Earth's magnetic field to detect, for example, that a wheel is rotating. For example, changes in the sensor output may be detected as a wheel moves through the static magnetic fields of the Earth, and the detected change can be used to calculate the acceleration. In addition or in the alternative, the magnetic sensor 11 may be configured as an magnetometer (e.g., a compass) to sense where the strongest magnetic force is coming from, which is generally used to detect magnetic north. Thus, under these applications, the magnetic sensor 11 should be a type of sensor (e.g., TMR sensor) sensitive enough to sense variations in the magnetic field of the Earth. By implementing magnetic sensor 11 for LF communications and other sensor applications, additional technical benefits (e.g., lower current consumption, higher speed accuracy, etc.) may be realized which reduces overall system cost and increases system performance.

When a magnetic sensor type that is capable of responding to both time-varying as well as static magnetic fields is employed, e.g., a TMR type, the signal processing is a bit different between modulated and unmodulated cases. Nevertheless, many common elements remain. For example, FIG. 6 illustrates a block diagram of a LF receiver and demodulation circuit 600 according to one or more embodiments.

Similar to FIG. 5, the LF receiver and demodulation circuit 600 shown in FIG. 6, includes a magnetic sensor 611, amplifiers 612, an automatic gain control 613 and an ASK demodulator 614, a data slicer and sampler 615, a low pass filter 616, a decoder 617, a receive buffer 618 and a pattern matching unit 619. In addition, the LF receiver and demodulation circuit 600 includes an attenuator 620 configured to receive an input signal from an external LF antenna coil (not shown), amplifiers 621, an automatic gain control 622, a detector 623, and a multiplexer 624. In addition, a bypass circuit 625 is provided to enable the detection of static magnetic fields. The bypass circuit 625 is enabled by a demodulation bypass signal. When enabled, the bypass circuit 625 receives the input signal from the magnetic sensor 611 (via the amplifiers 612) and provides the input signal to the multiplexer 624. Thus, the ASK demodulator 614 is bypassed and the multiplexer 624 receives a signal from the bypass circuit 625 instead of from the ASK demodulator 614. The signal is then output by the multiplexer 624 and processed by the rest of the LF receiver and demodulation circuit 600. Accordingly, the LF receiver and demodulation circuit 600 provides the ability to support an internal integrated magnetic field detector (e.g., a TMR sensing element) and external LF antenna coil for modulated LF uplink communications, as well as the possibility to support an unmodulated magnetostatic uplink communications.

One or more of the components of the LF receiver and demodulation circuit 600 may be incorporated into an MCU of the TPMS sensor, integrated separately on the die of the TPMS sensor, or a combination thereof.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A sensor device, comprising:
   a microcontroller unit;
   a receiver electrically connected to the microcontroller unit and configured to receive at least one communication signal, the receiver including a magnetic sensor configured to detect a modulated electromagnetic carrier signal as a first communication signal and output an encoded measurement signal based on the detected modulated electromagnetic carrier signal; and
   a demodulator configured to convert the encoded measurement signal into a data signal and output the data signal to the microcontroller unit.

2. The sensor device of claim 1, wherein the sensor device is monolithic.

3. The sensor device of claim 1, wherein the modulated electromagnetic carrier signal is an amplitude shift keying (ASK) modulated electromagnetic carrier signal.

4. The sensor device of claim 1, wherein the magnetic sensor is an earth magnetic field sensor having a sensitivity to sense at least a magnitude equivalent to a magnitude of an Earth magnetic field.

5. The sensor device of claim 1, wherein the magnetic sensor is an multiple axis magnetic sensor.

6. The sensor device of claim 1, wherein the magnetic sensor is a tunneling magneto-resistive (TMR) sensor.

7. The sensor device of claim 1, wherein the magnetic sensor is configured to detect time-varying magnetic fields for receiving the modulated electromagnetic carrier signal and static magnetic fields for providing magnetostatic field information to the microcontroller unit.

8. The sensor device of claim 7, wherein the microcontroller unit is configured to detect changes in a sensor output of the magnetic sensor as the magnetic sensor passes through the static magnetic fields and calculate an acceleration of the sensor device based on the detected changes in the sensor output.

9. The sensor device of claim 7, wherein the microcontroller unit is configured to calculate compass information based on the magnetostatic field information.

10. The sensor device of claim 7, further comprising:
    a bypass circuit configured to selectively bypass the demodulator such that microcontroller unit receives the magnetostatic field information from the magnetic sensor, instead of a signal from the demodulator, on a condition that the bypass circuit is enabled.

11. The sensor device of claim 1, wherein the receiver is configured to receive an antenna signal generated from a second communication signal received by an external antenna coil, the sensor device further comprising:
a multiplexer configured to receive a first signal derived from the modulated electromagnetic carrier signal or a second signal derived from the antenna signal, and selectively output one of the first signal or the second signal to the microcontroller unit.

12. The sensor device of claim 1, wherein the receiver includes an antenna coil configured to receive a second communication signal and generate an antenna signal based on the second communication signal, the sensor device further comprising:
a multiplexer configured to receive a first signal derived from the modulated electromagnetic carrier signal or a second signal derived from the antenna signal, and selectively output one of the first signal or the second signal to the microcontroller unit.

13. The sensor device of claim 7, wherein the receiver is configured to receive an antenna signal generated from a second communication signal received by an external antenna coil, the sensor device further comprising:
a multiplexer configured to receive a first signal derived from one of the modulated electromagnetic carrier signal and the magnetostatic field information or receive a second signal derived from the antenna signal, and selectively output one of the first signal or the second signal to the microcontroller unit.

14. The sensor device of claim 13, further comprising:
a bypass circuit configured to be selectively enabled to bypass the demodulator such that multiplexer receives the magnetostatic field information from the magnetic sensor, instead of a signal from the demodulator, when the bypass circuit is enabled.

15. The sensor device of claim 1, further comprising:
a transmitter configure to transmit a radio frequency signal in response to the receiver receiving the at least one communication signal.

16. The sensor device of claim 1, wherein the modulated electromagnetic carrier signal is modulated such that the modulated electromagnetic carrier signal is present at a carrier frequent or not present according to an encoded time pattern, and the magnetic sensor is configured to detect the encoded time pattern of the modulated electromagnetic carrier signal and convert the time pattern into the encoded measurement signal.

17. A method for communicating with a sensor device comprising a microcontroller unit and a receiver electrically connected to the microcontroller unit and configured to receive at least one communication signal, wherein the receiver includes a magnetic sensor, the method comprising:
detecting, by the magnetic sensor, a modulated electromagnetic carrier signal as a first communication signal;
outputting, by the magnetic sensor, an encoded measurement signal based on the detected modulated electromagnetic carrier signal;
converting, by a demodulator, the encoded measurement signal into a data signal; and
outputting, by the demodulator, the data signal to the microcontroller unit.

18. The method of claim 17, further comprising:
detecting, by the magnetic sensor, static magnetic fields; and
transmitting, by the magnetic sensor, magnetostatic field information to the microcontroller unit.

19. The method of claim 18, further comprising:
selectively bypassing, by a bypass circuit, the demodulator such that microcontroller unit receives the magnetostatic field information from the magnetic sensor, instead of a signal from the demodulator, when the bypass circuit is enabled.

20. The method of claim 17, further comprising:
receiving, by the receiver, an antenna signal generated from a second communication signal received by an external antenna coil; and
selectively outputting, by a multiplexer, one of a first signal or a second signal to the microcontroller unit, wherein the first signal is derived from the magnetic sensor and the second signal is derived from the antenna signal.

* * * * *